United States Patent
Siegel

(10) Patent No.: US 11,138,363 B2
(45) Date of Patent: *Oct. 5, 2021

(54) COMPUTERIZED METHOD AND COMPUTER PROGRAM FOR DISPLAYING AND PRINTING MARKUP

(71) Applicant: Gary Siegel, Miami, FL (US)

(72) Inventor: Gary Siegel, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/372,332

(22) Filed: Apr. 1, 2019

(65) Prior Publication Data

US 2019/0278832 A1  Sep. 12, 2019

Related U.S. Application Data

(63) Continuation-in-part of application No. 14/190,548, filed on Feb. 26, 2014, now Pat. No. 10,255,256, which is a continuation-in-part of application No. 12/424,005, filed on Apr. 15, 2009, now Pat. No. 8,700,984.

(51) Int. Cl.
*G06F 17/00* (2019.01)
*G06F 40/109* (2020.01)
*G06F 40/106* (2020.01)
*G06F 40/117* (2020.01)
*G06F 40/166* (2020.01)
*G06F 40/197* (2020.01)

(52) U.S. Cl.
CPC .......... *G06F 40/109* (2020.01); *G06F 40/106* (2020.01); *G06F 40/117* (2020.01); *G06F 40/166* (2020.01); *G06F 40/197* (2020.01)

(58) Field of Classification Search
CPC ..... G06F 40/106; G06F 40/109; G06F 40/117
USPC ................................................. 715/230, 263
See application file for complete search history.

(56) References Cited

U.S. PATENT DOCUMENTS

| | | | | |
|---|---|---|---|---|
| 5,666,139 A | * | 9/1997 | Thielens | G06F 40/166 345/173 |
| 6,370,282 B1 | * | 4/2002 | Pavley | G06F 3/0236 348/333.02 |
| 8,504,369 B1 | * | 8/2013 | Chigier | G10L 15/26 704/270 |
| 8,700,984 B2 | * | 4/2014 | Siegel | G06F 40/103 715/230 |
| 10,255,256 B2 | * | 4/2019 | Siegel | G06F 40/103 |

OTHER PUBLICATIONS

Minal Agarwal, How to Track And Review Changes in Microsoft Word 2007, Published Aug. 16, 2008 (Year: 2008).*
Microsoft Word 2003 Screenshots pp. 1 through 5 (Year: 2003).*
Microsoft Word 2007 to 2016, 'Home and Learn Word Course', homeandlearn.co.uk/word2007_2010/s11p1.html (Year: 2007).*

* cited by examiner

*Primary Examiner* — Stephen S Hong
*Assistant Examiner* — Matthew J Ludwig
(74) *Attorney, Agent, or Firm* — Patrick Cesarano

(57) ABSTRACT

Aspects of this disclosure relate to a process whereby markup text and/or graphics may be overlaid on top of an original document such that a user may view both the original document and the overlaid text and graphics together in an unobtrusive manner. Some aspects further discuss broader markup functionalities, such as modifying the content or appearance of text and graphics when a mark-up function is performed.

8 Claims, 10 Drawing Sheets

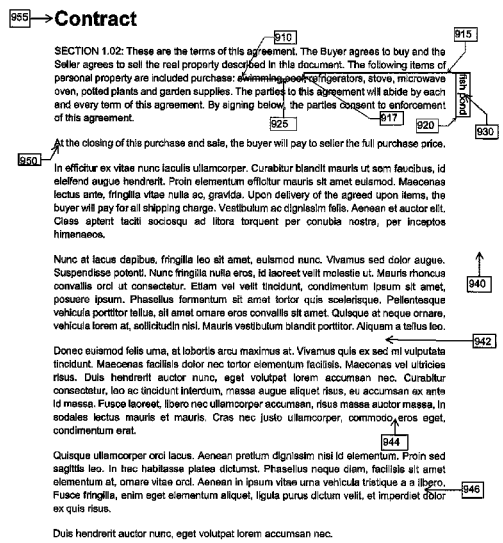

[115] [110] [125]

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

[120] *property*

[130] [140]

SECTION 1.03: These are the terms of this agreement. The Buyer agrees to buy and the Seller agrees to sell the items described in this document. Here are some more provisions of this agreement. ~~The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement.~~ The parties to this agreement will abide by each and every term of this agreement. By signing below, the parties consent to enforcement of this agreement. [145]

[135] *deleted, not needed*

[165] [150] [155]

SECTION 1.04: These are the terms of this agreement. The Buyer agrees to buy and the Seller agrees to sell the items [described] in this document. Here are some more provisions of this agreement. The parties to this agreement will abide by each and every [160] term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

[165] *listed*

[170] [180]

SECTION 1.05: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The *Buyer* agrees to buy and the Seller agrees to sell the items described in this document. Here are some more provisions of this agreement. The parties to this agreement will abide by each and every term of this agreement. By signing below, the parties consent to enforcement of this agreement. [185]

[175] *note: binding on buyer*

SECTION 1.06: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

[225] *Signature required!*

[215] SECTION 1.07: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.08: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.09: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 2

PURCHASE AGREEMENT

This Agreement is made and entered into this ____ day of _____, _____, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by ~~each and~~ every term of this agreement. By signing below, the parties consent to enforcement of this agreement.

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement.

Fig. 3

PURCHASE AGREEMENT

This Agreement is made and entered into this _____ day of _____, _____, by and between ABC Corporation ("Seller") and XYZ, Inc. ("Buyer").

For and in consideration of $10.00 and other good and valuable consideration, the parties agree as follows:

SECTION 1.01. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 4

PURCHASE AGREEMENT

This Agreement is made and entered into this _____ day of _____,
_____, by and between ABC Corporation ("Seller") and XYZ, Inc. ("Buyer").

For and in consideration of $10.00 and other good and valuable consideration, the parties agree as follows:

SECTION 1.01. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

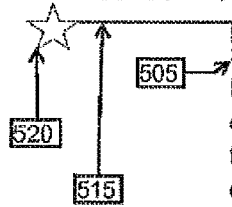

SECTION 1.02: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 5

PURCHASE AGREEMENT

This Agreement is made and entered into this ____ day of _____, _____, by and between ABC Corporation ("Seller") and XYZ, Inc. ("Buyer").

For and in consideration of $10.00 and other good and valuable consideration, the parties agree as follows:

SECTION 1.01: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. [610] [605] [615]

SECTION 1.02: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. [675] [660] [655] [620] [670]

SECTION 1.03: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. [665]

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 6

PURCHASE AGREEMENT

This Agreement is made and entered into this ____ day of _____, _____, by and between ABC Corporation ("Seller") and XYZ, Inc. ("Buyer").

For and in consideration of $10.00 and other good and valuable consideration, the parties agree as follows:

[715] SECTION 1.01. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this ~~agreement~~ The Buyer [705] agrees to buy and the Seller agrees to sell the items described in this document. Here are some more provisions of this agreement. The parties to this agreement [720] will abide by each and every term of this agreement. By signing below, the parties consent to enforcement of this agreement. [710]

SECTION 1.02: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.03: These are the provisions of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

SECTION 1.04: These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement. These are the terms of this agreement. The Buyer agrees to buy and the Seller agrees to sell the items described in this document. Here are some more provisions of this agreement. The parties to this agreement will abide by each and every term of this agreement. By signing below, the parties consent to enforcement of this agreement.

Fig. 7

Contract

SECTION 1.02: These are the terms of this agreement. The Buyer agrees to buy and the Seller agrees to sell the real property described in this document. The following items of personal property are included purchase: swimming pool, refrigerators, stove, microwave oven, potted plants and garden supplies. The parties to this agreement will abide by each and every term of this agreement. By signing below, the parties consent to enforcement of this agreement.

At the closing of this purchase and sale, the buyer will pay to seller the full purchase price.

In efficitur ex vitae nunc iaculis ullamcorper. Curabitur blandit mauris ut sem faucibus, id eleifend augue hendrerit. Proin elementum efficitur mauris sit amet euismod. Maecenas lectus ante, fringilla vitae nulla ac, gravida. Upon delivery of the agreed upon items, the buyer will pay for all shipping charge. Vestibulum ac dignissim felis. Aenean et auctor elit. Class aptent taciti sociosqu ad litora torquent per conubia nostra, per inceptos himenaeos.

Nunc at lacus dapibus, fringilla leo sit amet, euismod nunc. Vivamus sed dolor augue. Suspendisse potenti. Nunc fringilla nulla eros, id laoreet velit molestie ut. Mauris rhoncus convallis orci ut consectetur. Etiam vel velit tincidunt, condimentum ipsum sit amet, posuere ipsum. Phasellus fermentum sit amet tortor quis scelerisque. Pellentesque vehicula porttitor tellus, sit amet ornare eros convallis sit amet. Quisque at neque ornare, vehicula lorem at, sollicitudin nisi. Mauris vestibulum blandit porttitor. Aliquam a tellus leo.

Donec euismod felis urna, at lobortis arcu maximus at. Vivamus quis ex sed mi vulputate tincidunt. Maecenas facilisis dolor nec tortor elementum facilisis. Maecenas vel ultricies risus. Duis hendrerit auctor nunc, eget volutpat lorem accumsan nec. Curabitur consectetur, leo ac tincidunt interdum, massa augue aliquet risus, eu accumsan ex ante id massa. Fusce laoreet, libero nec ullamcorper accumsan, risus massa auctor massa, in sodales lectus mauris et mauris. Cras nec justo ullamcorper, commodo eros eget, condimentum erat.

Quisque ullamcorper orci lacus. Aenean pretium dignissim nisi id elementum. Proin sed sagittis leo. In hac habitasse platea dictumst. Phasellus neque diam, facilisis sit amet elementum at, ornare vitae orci. Aenean in ipsum vitae urna vehicula tristique a a libero. Fusce fringilla, enim eget elementum aliquet, ligula purus dictum velit, et imperdiet dolor ex quis risus.

Duis hendrerit auctor nunc, eget volutpat lorem accumsan nec.

Fig. 8

|955| → Contract

|910|

SECTION 1.02: These are the terms of this agreement. The Buyer agrees to buy and the Seller agrees to sell the real property described in this document. The following items of |915| personal property are included purchase: ~~swimming pool~~, refrigerators, stove, microwave oven, potted plants and garden supplies. The parties to this agreement will abide by each and every term of this agreement. By signing below, the parties consent to enforcement of this agreement. |925| |917| |920| |fish pond| |930|

|950| At the closing of this purchase and sale, the buyer will pay to seller the full purchase price.

In efficitur ex vitae nunc iaculis ullamcorper. Curabitur blandit mauris ut sem faucibus, id eleifend augue hendrerit. Proin elementum efficitur mauris sit amet euismod. Maecenas lectus ante, fringilla vitae nulla ac, gravida. Upon delivery of the agreed upon items, the buyer will pay for all shipping charge. Vestibulum ac dignissim felis. Aenean et auctor elit. Class aptent taciti sociosqu ad litora torquent per conubia nostra, per inceptos himenaeos.

Nunc at lacus dapibus, fringilla leo sit amet, euismod nunc. Vivamus sed dolor augue. Suspendisse potenti. Nunc fringilla nulla eros, id laoreet velit molestie ut. Mauris rhoncus convallis orci ut consectetur. Etiam vel velit tincidunt, condimentum ipsum sit amet, |940| posuere ipsum. Phasellus fermentum sit amet tortor quis scelerisque. Pellentesque vehicula porttitor tellus, sit amet ornare eros convallis sit amet. Quisque at neque ornare, vehicula lorem at, sollicitudin nisi. Mauris vestibulum blandit porttitor. Aliquam a tellus leo.

|942|

Donec euismod felis urna, at lobortis arcu maximus at. Vivamus quis ex sed mi vulputate tincidunt. Maecenas facilisis dolor nec tortor elementum facilisis. Maecenas vel ultricies risus. Duis hendrerit auctor nunc, eget volutpat lorem accumsan nec. Curabitur consectetur, leo ac tincidunt interdum, massa augue aliquet risus, eu accumsan ex ante id massa. Fusce laoreet, libero nec ullamcorper accumsan, risus massa auctor massa, in sodales lectus mauris et mauris. Cras nec justo ullamcorper, commodo eros eget, condimentum erat. |944|

Quisque ullamcorper orci lacus. Aenean pretium dignissim nisi id elementum. Proin sed sagittis leo. In hac habitasse platea dictumst. Phasellus neque diam, facilisis sit amet elementum at, ornare vitae orci. Aenean in ipsum vitae urna vehicula tristique a a libero. Fusce fringilla, enim eget elementum aliquet, ligula purus dictum velit, et imperdiet dolor |946| ex quis risus.

Duis hendrerit auctor nunc, eget volutpat lorem accumsan nec.

Fig. 9

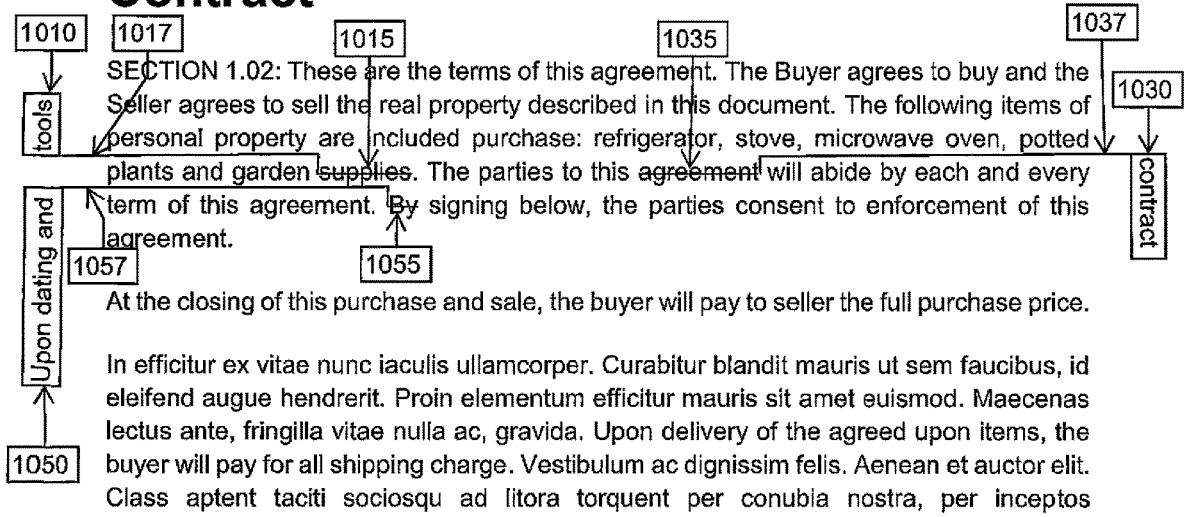

Contract

SECTION 1.02: These are the terms of this agreement. The Buyer agrees to buy and the Seller agrees to sell the real property described in this document. The following items of personal property are included purchase: refrigerator, stove, microwave oven, potted plants and garden supplies. The parties to this agreement will abide by each and every term of this agreement. By signing below, the parties consent to enforcement of this agreement.

At the closing of this purchase and sale, the buyer will pay to seller the full purchase price.

In efficitur ex vitae nunc iaculis ullamcorper. Curabitur blandit mauris ut sem faucibus, id eleifend augue hendrerit. Proin elementum efficitur mauris sit amet euismod. Maecenas lectus ante, fringilla vitae nulla ac, gravida. Upon delivery of the agreed upon items, the buyer will pay for all shipping charge. Vestibulum ac dignissim felis. Aenean et auctor elit. Class aptent taciti sociosqu ad litora torquent per conubia nostra, per inceptos himenaeos.

Nunc at lacus dapibus, fringilla leo sit amet, euismod nunc. Vivamus sed dolor augue. Suspendisse potenti. Nunc fringilla nulla eros, id laoreet velit molestie ut. Mauris rhoncus convallis orci ut consectetur. Etiam vel velit tincidunt, condimentum ipsum sit amet, posuere ipsum. Phasellus fermentum sit amet tortor quis scelerisque. Pellentesque vehicula porttitor tellus, sit amet ornare eros convallis sit amet. Quisque at neque ornare, vehicula lorem at, sollicitudin nisi. Mauris vestibulum blandit porttitor. Aliquam a tellus leo.

Donec euismod felis urna, at lobortis arcu maximus at. Vivamus quis ex sed mi vulputate tincidunt. Maecenas facilisis dolor nec tortor elementum facilisis. Maecenas vel ultricies risus. Duis hendrerit auctor nunc, eget volutpat lorem accumsan nec. Curabitur consectetur, leo ac tincidunt interdum, massa augue aliquet risus, eu accumsan ex ante id massa. Fusce laoreet, libero nec ullamcorper accumsan, risus massa auctor massa, in sodales lectus mauris et mauris. Cras nec justo ullamcorper, commodo eros eget, condimentum erat.

Quisque ullamcorper orci lacus. Aenean pretium dignissim nisi id elementum. Proin sed sagittis leo. In hac habitasse platea dictumst. Phasellus neque diam, facilisis sit amet elementum at, ornare vitae orci. Aenean in ipsum vitae urna vehicula tristique a a libero. Fusce fringilla, enim eget elementum aliquet, ligula purus dictum velit, et imperdiet dolor ex quis risus.

Duis hendrerit auctor nunc, eget volutpat lorem accumsan nec.

Fig. 10

COMPUTERIZED METHOD AND COMPUTER PROGRAM FOR DISPLAYING AND PRINTING MARKUP

REFERENCE TO CO-PENDING APPLICATIONS

This application is a Continuation-in-Part of application Ser. No. 14/190,548 filed Feb. 26, 2014 also entitled "COMPUTERIZED METHOD AND COMPUTER PROGRAM FOR DISPLAYING AND PRINTING MARKUP", which was a Continuation-in-Part of U.S. Pat. No. 8,700,984 filed Apr. 15, 2009 also entitled "COMPUTERIZED METHOD AND COMPUTER PROGRAM FOR DISPLAYING AND PRINTING MARKUP". The disclosure of the prior applications is hereby incorporated by reference herein in their entireties.

Some aspects of application Ser. No. 14/190,548 describe methods in which a document may be marked up and altered. This continuation in part describes, among other things, further methods in which a document may be marked up and altered.

DEFINITIONS

"Marked changes" may include graphics or text added to or overlaid onto a document, a change in the font attributes or typeface of text contained in the document, a change in the text, formatting or layout of text or graphics of the original document, or any combination of the foregoing. Marked changes may include a reference graphic.

"Strikethrough element" describes a line or other graphic that appears over or as part of a text character or space when a strikethrough font attribute is applied to the text or space; it may appear approximately in the vertical mid-point of the text character or space; it is intended to reflect that the text and spaces are stricken.

A "change location" is a place defined by a user on an original document where marked changes may be made, overlaid or applied. "Change location" may also be referred to as "selected region".

"Selected text" describes the text that is contained within a selected region.

"Modified change location describes the portion of the original document between the start and end point of the change location, after change location is modified by the methods described herein.

"White space non-text graphic" describes a graphic that does not contain user-inputted text that is to be located in the white space of a document, such as in the margins, between blocks or lines of text in the original document, or generally referring to any portion of the document not obscuring original text or graphics. The white space non-text graphic may be located within a white space and generally does not cross text in the original document. The white space non-text graphic may contain text that was not user-inputted, wherein the text is part of the graphic.

"White space element" refers to either a white space graphic or a white space non-text graphic.

"Connection graphic" describes a graphic that indicates a relationship or connection between a reference graphic and the white space graphic such as a series of intersecting line segments that extend from the reference graphic to the white space graphic. Unless modified by a preference setting or user input, a connection graphic may usually be located within white space and not cross text in the original document.

"Textual attribute" refers to the identity of a textual element, such as the letters "c", or "t" in the word "cat". Collectively, textual attributes are generally referred to as "characters".

"Graphical attribute" refers to the identity of a media element, such as an image or graphic.

"Font attribute" commonly refers to a generalized data item often associated, visually, with a textual attribute in a document. Bold, underline, strikethrough, etc. are each examples of a font attribute. A font attribute can usually be regarded as being either indicative or instructive with regard to how the text attribute is configured for display or printing. However, a font attribute may also relate to any other relevant information regarding the text attribute, such as an association with a particular document feature, such as a title or footnote. For example, the title of a play may be expected or required to be in all capital letters ("all caps"), which is a font attribute, and centered on the page. Accordingly, a reader may surmise that the centered, all capitalized text at the top of their program is in fact the play's title, based on one or more font attributes. Some other commonly referenced examples of a font attribute include, without limitation: strikeout/strikethrough (the terms strikeout and strikethrough are used interchangeably here), double strikethrough, underline, underline style, double underline, bold, italic, font color, background color, underline color, highlight, subscript, superscript, uppercase, hidden, lowercase, small caps, all caps, initial caps, typeface, font family, font weight, font size, text fill, text outline, font features, etc.

"Font attribute change" may refer, inclusively, to any of the following processes related to one or more text attributes in a document: a process of adding a new font attribute (such as the addition of a strikethrough attribute to existing text), a process of modifying an existing font attribute (as applied to a given text attribute; for example, changing an existing font attribute from underline to strikethrough), or a process of eliminating an existing font attribute as applied to the given portion text (for example, removing a strikeout font attribute from document text).

"Formatting change" refers to a change to a document other than either a change to text content or font attribute change; "Formatting change" includes, without limitation, changes to indention, margins, line spacing, character spacing and tabs.

"Formatting attribute" may refer to items of data that limit or delineate regions of white space or text, such as margins, and may have differing names or common uses, such as: margin, line spacing, character spacing, paragraph spacing, tabs, indent, spacing, column, gutter, orientation, paper size, page width, page height, aspect ratio, page break, hyphenation, alignment (for example, center or justification), word wrapping, magnification, demagnification, panel and section, or may refer to collections of "blank" (or space bar) characters in varying amounts. Formatting attributes can form pools of white space within, adjacent to, and around the document, which can later be re-claimed for a useful purpose, such as generating an informational graphic (more below).

Formatting attributes can affect the position of both text and media (such as images and graphics) within the document. Formatting attributes (such as margins, sections, panels, paper-size or page width) can also influence the shape of the document. Importantly, processes such as textual attribute changes and font attribute changes can each create and/or destroy font attributes. In the case of a text attribute change, for example, the process "doctor"→"primary care physician" generates two (exactly) "unit" formatting attributes (space characters). More interestingly, however, is the fractional accumulation or depletion of formatting attributes following a format attribute change vis-a-vis the point (or decimal) structure (12 pt. Times New Roman, e.g.) of font attributes. That is, font attribute changes for greater emphasis, such as the emboldening a textual attribute, will tend to devour the exact same space as the 12 pt. version, plus a small fraction extra for the emboldening pixels, consuming the equivalent of (say) a 12.32 pt. non-emboldened textual attribute. The formatting attributes in this process have thus contributed or withdrawn fractionally with one or more white space pools, which may be drawn upon later for necessary spatial resources.

"Formatting attribute change" may refer, inclusively, to any of the following processes related to the interaction of one or more formatting attributes with one or more white space pools in a document (alternatively stated, the white space size value will change into a relative white space size value following the generation of a font, textual or graphical attribute change—the relative white space size value may be greater than or less than the white space size value that existed immediately prior to the font attribute change depending on the nature of the font attribute change, as calculated from the following processes): a process of contributing formatting attributes (whole or fractional, such as the process 12 pt. font →9.25 pt. font), a process of modifying formatting attributes (whole or fractional, such as moving text around without the application of a textual or font attribute change), and a process of depleting formatting attributes (fractional or whole, such as the process 9.5 pt. font →12 pt. font). This complexity can be compounded by the fractional nature of formatting attributes and the fact that their contributions are also signed (positive or negative). Consequently, it can be substantially more difficult for a human to perform a document white space audit than for a processor.

"Profile display" is an end result, generally a visually cumulative display, of the elemental contributions to a document of each of the textual, graphical, font and/or formatting attribute change processes. Following a font attribute change, as an example, the profile display may be characterized by the emergence of an informational graphic, as defined in greater detail below.

"Informational graphic" may be used to refer to any combination or number of combinations of white space elements, connection graphics, and reference graphics used to provide information about a singular font, textual or graphical attribute change event. For example, the font attribute change process "cat"→"cat" may alone produce (1) a white space element near the region of the font attribute or textual change, (2) a reference graphic generally referencing the textual or font attribute change location within the document's textual attributes, and (3) a connection graphic (situated such as to visually connect each of the white space element, connection graphic, and either reference graphic or region of the font, textual or graphical attribute change in the mind of a reader; incidentally, the process may also additionally produce other artifacts). For brevity, however, we may simply state that an informational graphic is produced once the singular font, textual or graphical attribute change event has occurred.

Informational graphics may be added as absolutely positioned elements within the relative white space of a document without causing any other document modification or change to the profile display, as will be well-known to those skilled in the art. For example, informational graphics may be included in an absolutely positioned text box whose text wrapping and fill settings are set to none (or similar settings that prevent text wrapping such as "in front of text" while specifying no fill). Created in this manner, the informational graphic will not cause other text or graphics in the document to shift as a result of flow within a text editor. A comparison of FIGS. 8 and 9 show that adding an informational graphic does not cause any change to the document apart from the appearance of an informational graphic in the relative white space, as can be seen by comparing FIG. 9 with the original document depicted in FIG. 8.

Information is conveyed by the informational graphic regarding the font, textual or graphical attribute change that caused the informational graphic to be generated. For example, the informational graphic may indicate that the process "cat"→"cat" occurred. The informational graphic is generated in the profile display following the application of a font, textual or graphical attribute or other change process, and the placement of the informational graphic can be directly dependent on the relative white space near the desired informational graphic location.

"Relative white space" refers to a location where an informational graphic may be generated and refers to the net white space that will exist immediately following the font, textual or graphical attribute change that causes the informational graphic to be generated and prior to the generation of the informational graphic. In particular, and with respect to an informational graphic specifically, the relative white space can refer to both qualitative and quantitative information such as an amount, a type, and/or a location of a white space resource (such as a formatting attribute pool) in a document. In this expression, relative refers to both an amount and a location of white space of a document relative to the displayed or printed size or magnification of a document.

One important property of relative white space is that it does not change in response to changes in magnification of the document (such a change could occur, for example, when displaying documents on monitors of varying size, or when printing a document to at various differing paper sizes). In contrast, various other processes (such as a change in the width of a margin or to the shape of the document) are examples of modifications that may change the relative amount of white space in the document.

"Document shape" refers to the general shape of a document as determined by the textual, graphical, font, and formatting attributes of the document.

"Electronic signing session" refers to a process of electronically presenting a document to one or more persons in order to obtain their electronic signatures to the document and recording responses from those persons.

The above definitions are not limiting and may include variations and their equivalents as would be well-known to one of skill in the art.

BRIEF DESCRIPTION OF THE DRAWINGS

FIG. 1 demonstrates some aspects of markup discussed herein and illustrate possible visual outcomes of said markups such as font changes or illustrative changes;

FIG. 2 demonstrates some further aspects of markup discussed herein including color variations to the markup and/connection graphic;

FIG. 3 demonstrates some aspects of markup discussed herein and illustrates further visual outcomes of said markups including strike-out markup;

FIG. 4 demonstrates some aspects of markup discussed herein and illustrative possible visual outcomes of said markups such as reformatting the selected;

FIG. 5 demonstrates some aspects of markup discussed herein and illustrative possible visual outcomes of said markups such as further reformatting examples of the selected and marked-up text;

FIG. 6 demonstrates some further aspects of markup discussed herein and illustrative possible visual outcomes of said markups;

FIG. 7 demonstrates some further aspects of markup discussed herein and illustrative possible visual outcomes of said markups;

FIG. 8 demonstrates some further aspects of markup discussed herein and illustrative possible visual outcomes of said markups;

FIG. 9 demonstrates some further aspects of markup discussed herein and illustrative possible visual outcomes of said markups; and FIG. 10 demonstrates some further aspects of markup discussed herein and illustrative possible visual outcomes of said markups.

DETAILED DESCRIPTION OF SOME PREFERRED EMBODIMENTS

Functionality

A) In cases where the selected region contains one or more characters of text, the following may apply:

A reference graphic may be generated at the selected region without changing the original document, or a change may be made to the original document or both. Types of changes to the original document may include font attribute changes, changes in text, changes in document formatting or layout, other document changes or any combination of the foregoing.

A font attribute can be an item of data that is related to text and indicates that the related text should be displayed, printed or associated with a specific appearance. Font attributes that may be modified include, but are not limited to, strikeout/strikethrough (the terms strikeout and strikethrough are used interchangeably here), underline, double-underline, bold, italic, foreground color, background color, highlight, subscript, superscript, uppercase, lowercase, small caps, initial caps, typeface, font weight, font family, font size, etc. A modification to font attributes may include adding a new attribute (such as the addition of a strikethrough attribute), changing an existing attribute (for example, changing from underline to strikethrough) or simply eliminating an existing font attribute. There are various ways to modify font attributes that are well-recognized by those skilled in the art to which this claimed invention belongs. One such way is to store font attribute codes within a digitized document that indicate the start and end of text to which a particular font attribute applies.

For example, there could be a "strikeout on" code associated with the position of a character of text and also a "strikeout off code" associated with the position of another character of text that appears later in the document. Together, those codes may indicate that text between the codes should display and print with strikeout. Some font attribute changes, such as strikethrough, will generally change only the appearance of selected text without materially changing the selected text's position in the document and without changing any other document formatting or the flow of other text or graphics in the document. Other font attribute changes, text changes, formatting and layout changes and other changes may change the flow of text and graphics in the document.

When a change location is determined from user input, such as by specifying the start and end points of a location in a document via a mouse click or mouse drag or touch gesture, various preferences may determine whether to add a reference graphic to the original document, or make a change to the original document or both. The type of reference graphic or document change (including font attribute changes) or the type and appearance of the connection graphic may be determined by other preferences.

When a preference specifies that the font attributes of selected text are to be changed, another preference can determine which font attributes are to be applied or changed; in that case, by default, a strikethrough font attribute may be applied. When font attributes are to be changed, by default there will be no reference graphic. In that case, by default, the connection graphic can connect the strikethrough element of the selected text, or a point near the strikethrough element, to the white space element. The preferences may initially be determined by default settings that do not require any user input. Generally users may change a default preference by performing an additional user-input step. For example, a mouse-click or finger press on a displayed toolbar or button may specify that a bold font attribute is to be added to the selected text instead of the default strikethrough font attribute.

Generally, the default preferences could specify that, for example, no reference graphic will be generated, a strikethrough font attribute will be applied to the selected text, a white space element will be generated (which includes user-inputted text, if entered) and a connection graphic will connect the selected text to a white space graphic. The resulting visual appearance may be very similar to single line strikeout and adjacent line strikeout; the main difference being that instead of a strikeout line being overlaid on top of the selected text, a strikethrough font attribute may be applied to the selected text. A preference may also be used to determine that a specific type of reference graphic is to be used when font attributes are also changed; for example, the reference graphic could contain a border surrounding the selected text, or a border combined with a caret. Any combination of reference graphic and font attribute change may specified by preferences.

Preferences may also specify how the connection graphic connects with the reference graphic or selected text, depending upon the nature of the reference graphic or selected text. For example, the connection graphic could touch the strikeout element of the selected text, an edge of a character of the selected text or the edge of a reference graphic such as a border, the top edge of a caret, etc., or the connection graphic could start at or be placed near enough to the selected text or reference graphic to provide a visual connection to the selected text or reference graphic as the case may be. Where the connection graphic is to touch an edge of a character of the selected text, a preference may specify which point of the text the connection graphic connects to.

For example, where a character, word or contiguous words are selected, the connection point could be the point of the text characters that is closest to one margin or another, as further specified in the preferences, or closest to the margin where a white space element may appear. Where both changing a font attribute of selected text and also generation of a reference graphic at the selected region are required, a preference may determine the connection point and whether the connection is made to the selected text or the reference graphic, the default preference usually being a connection to the reference graphic, although preferences may be readily changed.

One item of user input can define the change location on the digitized document. The user may also input text to include in the white space element; otherwise a default white space element may be used. The user may also input text to replace the text in the change location, but otherwise a default preference may determine what change to the document will be made at the change location or the type of reference graphic to be generated at the change location, or both. The following demonstrates some effects of various preferences after the user defines the change location.

1) Using the default preferences, which might specify that a change of font attributes and not a reference graphic should be used at the selected region, a strikethrough font attribute may be added to the selected text, a white space element may be added to the document and a connection graphic may be generated between the selected text and the white space element.
2) When the preferences specify that a reference graphic should be generated at the selected region and not a change in font attributes, the reference graphic may be generated at the selected region, a white space element may be added to the document and a connection graphic may be generated between the reference graphic and the white space element;
3) When the preferences specify that both a reference graphic and also a change of font attributes should be used at the selected region, a strikethrough font attribute may be added to the selected text, a reference graphic may be generated at the region, a white space element may be added to the document and a connection graphic may be generated between the white space element and the reference graphic.

If the user had also inputted an item of text, a preference can determine whether the inputted text will be included in the white space element or will replace the original text in the change location. By default, generally the first item of text inputted by the user may be contained in the white space element.

A preference could instead determine that the first item of user-inputted text should replace the original characters of the selected text; in that case the white space element might be a default white space non-text graphic, the selected text in the change location could be replaced by the user-inputted text and a connection graphic could connect the new text in the document to the white non-text graphic.

The user may alternatively input two items of text in addition to defining the change location; in that event one of the items of text may be contained in the white space element and the other may replace the original text at the change location. A preference may determine that a formatting change should be made at the change location. An example of a formatting change may be comprised of indenting a paragraph. If a formatting change is made, a white space element could be generated and a connection graphic could connect the formatting change to the white space element.

Some marked changes may be completed using no more than one user-input step. For example, a user may want to strike through text, add a default white space non-text graphic, and also add a connection graphic connecting the two. This process may be completed using no more than one user input step: defining the change location on the digitized document. Once the change location is defined, a connection graphic and a white space non-text graphic could be automatically generated.

B) The program may accept additional user input that sets or overrides preferences, such as preferences for the reference graphic to be used, the type of reference graphic to be used, or the type of font attribute or other change to be made or the desired function or a combination of the foregoing.

For example, the user may click on a displayed toolbar button or menu item signifying that the desired function is to add a bold font attribute to selected text instead of the default strikethrough attribute; or the user could click a toolbar button to require that a specific type of reference graphic be used. For example, an oval may be chosen by the user instead of a rectangle to surround text, or a caret, arrow or dot could be chosen from a toolbar button for use as the point type reference graphic when the user identifies a location for a reference graphic. An additional option that may be chosen by a user may result in a formatting change, such as indenting text at the change location.

C) An option may be provided wherein the user may both enter text for the white space graphic and, via an additional user input event, select the specific graphic for the white space that is to contain the text.

D) A point type reference graphic may appear not only between characters or between lines, but could appear anywhere else in the white space of the document. For example, a point type reference graphic could appear just before the beginning of a line of text or just after the end of a line of text, near enough to the first character or last character on the line of text so as to indicate an insertion point.

E) If a preference is chosen that allows a connection graphic to cross text in the document, the connection graphic may be a straight line or other graphic. The connection graphic may have a light fill or translucent color to reduce obscuring of the text of the digitized document instead of with an opaque graphic with black fill. In a preferred embodiment, the default preference, which is used in the examples herein, specifies the location of the connection graphic as being located within white space without crossing text in the document.

F) The white space graphic will generally be placed at a location in the margin that is close to the selected region, while allowing sufficient room to allow a visible connection graphic between the white space graphic and either the reference graphic or the selected text, whichever is applicable. Generally, no part of the white space graphic will be within the selected region. The positioning of the white space graphic may be changed via a preference setting or user input.

G) The marked changes (comprised of an overlay, document change or both) may be incorporated into the original document. Alternatively, the marked changes may be incorporated into a new document in which the markup is combined with the content of the original document, or the marked changes may be stored in a separate computer file or memory space so that the original document may be displayed, printed or transmitted with or without the markup as desired. A description of the marked changes and their location may be stored with the document or separate from the document so that it will be possible to use a typical "undo" feature to reverse any changes. Additionally, a bitmap, vector or other graphical image of the document containing the marked changes may be generated, stored in computer memory, or saved as a computer file (such as a PDF, JPEG, BMP, TIFF or other computer file) which may be later displayed, printed or both, or transmitted by email or other typical method for transferring computer storage files.

DESCRIPTION OF MARKUP CREATION PROCESS

The method and computer program generally carries out these tasks as follows. If desired, the user may input text to be included in a white space element. The text is received from input performed by pressing characters on a keyboard or other input method. The user may also use an option to input additional text that will replace existing text in the original document, thus changing the document. User input is completed when the user defines a change location on the digitized document where a reference graphic will be placed, a change is to be made to the document or both. The change location is generally defined by the user's selection of one or two points on the digitized document. The point or points can be chosen using a single mouse click or single mouse drag or touch gesture or by another input device or other method. Choosing two points can indicate the start and end of the change location. In a preferred embodiment, once the change location is defined by the user, a white space element may automatically be generated along with a connection graphic reference graphic; additionally, a reference graphic may be automatically generated at the change location, or a change can be made to the document at the change location, or both.

The text within the change location becomes the selected text. To determine which text is between the two points, a standard text flow can be used. (For the English language, text on a line usually flows from left to right and then onto the next lower line of text, continuing from left to right on each succeeding lower line of text throughout the document.) For example, using the default preferences described herein, FIG. 1, Section 1.03, shows the effect of a strikethrough font attribute being added to the text 130 that was selected by dragging a mouse from the start of the text to be stricken Gust before "The parties", which establishes one point) to the end of the stricken text Gust after "agreement.", which establishes a second point).

When changing a font attribute, such as by adding a strikethrough font attribute, the attribute may be applied to specific non-space characters; alternatively, a preference may determine that the strikethrough attribute will apply to contiguous text characters and intervening spaces.

Modification of the original content of the document may be made by the user following the addition of markup if allowed by a preference. Such modification could be performed in the manner typically performed in a word processing, text editing or graphic application. Changes to text within the selected region may cause the region to expand or contract; a formatting or font attribute change according to an embodiment could apply to any newly added text within the selected region and any associated reference graphic may be regenerated over the modified region. Changes to the document that visibly appear earlier in the document compared with the selected region may cause the selected region to move along with the reference graphic, if any. When the selected region is modified or moved, the connection graphic can be regenerated so as to connect the changes in the change location to the white space element. The white space element may also be automatically moved so that it is located in white space that is close to the modified change location.

FIGS. 1 through 10 illustrate a few examples of marked changes that have been created from a variety of user inputs using the methods described herein:

a) Section 1.02 of FIG. 1 shows an example of the markup function "Font Strikeout and Replace". In this example, the preferences specify that a font attribute should be applied to the text in the change location instead of a reference graphic. The markup produced by the function Font Strikeout and Replace consists of: font attribute strikethrough applied to the selected text 110 instead of generating a reference graphic (the selected text is the word "items"); a connection graphic with line segments 115; and white space graphic containing the word "property" 120. For this markup function, the user enters the word "property" to be inserted in the white space graphic over the original document. Then, using the mouse, the user positions the cursor over the first character in the original document to be stricken and replaced and drags the mouse over each text character and space to be stricken and replaced. In this case the user dragged the mouse over each character in the word "items" 110.

Section 1.02 of FIG. 1 reflects the result markup elements 110, 115 and 120 of the two user input events: 1) text entry; and 2) selection of text using a mouse. The internal logic to perform this operation is similar to the logic detailed in the previous application for Line Strikeout and Replace, except: instead of placing a reference graphic over the text that is to appear stricken, a strikethrough font attribute may be applied to the selected text (the selected text 110 is the word "items" in FIG. 1) and the connection graphic 115 connects to the strikethrough element 125 that results from adding the strikethrough font attribute to the selected text, and the connection graphic extends to the white space graphic 120. The white space graphic was placed in the left margin by default.

b) Section 1.03 of FIG. 1 reflects the same process as the description above for section 1.02 of FIG. 1, except that section 1.03 of FIG. 1 shows the result from the user selecting a location that covers many words over several lines of text. Instead of Adjacent Line Strikeout and Replace or Z-Style strikeout and replace, a strikethrough font attribute is illustrated as being applied to several lines and partial lines of text 130 at that location. A connection graphic 135 (connecting to the strikeout element 145 of the word "agreement") and white space graphic 140 are also illustrated. For the white space graphic 140 Section 1.03 of FIG. 1 reflects that the user has entered "deleted, not needed" instead of "property". In this case section 1.03 of FIG. 1 also reflects an instance in which the user has selected to perform an additional step of selecting the right margin for the white space graphic location.

c) Section 1.04 of FIG. 1 reflects a similar process as described above in section 1.02 of FIG. 1, except that section 1.04 of FIG. 1 depicts a result when a preference specifies that in addition to applying a strikethrough font attribute to the selected text 150 (the selected text is the word "described"), a reference graphic consisting of a border 155 should also to be generated over the selected text at the selected region. For the white space graphic 165, FIG. 1 illustrates an instance in which the user has entered the word "listed". In this instance, the use of a border reference graphic has resulted in the connection graphic 160 connecting to the border 165 instead of the strikethrough element of the selected text.

d) Section 1.05 of FIG. 1 also reflects a similar process as the description above for section 1.02 of FIG. 1, except that section 1.05 of FIG. 1 illustrates an outcome when a preference setting specifies that the font attributes of bold and italic should be applied to the selected text 170 at a user-defined change location (in this case the selected text happens to be the word "Buyer"), instead of a strikethrough font attribute being applied to the selected text. For the white space graphic 180 the user has entered "note: binding on buyer". In this case the user also performed an optional third step of choosing the right margin for the white space graphic location. The generated connection graphic 175 is then illustrated as being connected to the edge 185 of the selected text 170 (the selected text is the word "Buyer") and extending to the white space graphic 180.

e) Section 1.06 of FIG. 2 also reflects a similar process as the description above for section 1.02 of FIG. 1, except that section 1.06 of FIG. 2 shows a result when a preference setting specifies that the font attribute of bold should be applied to the text at the user-defined location (in this case the selected text 210 happens to be the words "By signing below"), instead of a strikethrough font attribute being applied to the selected text. For the white space graphic 220 the user has entered "Signature required!" In this case the user has also performed an optional additional step of setting a preference that allows the connection graphic 215 to cross over text and a further optional step of setting a preference that chose the color blue for the connection graphic color. The connection graphic 215 is illustrated as being connected to the edge 225 of the selected text and extending to the white space graphic 220. The connection graphic 215 is a straight line because a straight line happens to be the default graphic when, as in this case, the preference was to allow the connection graphic to cross text.

f) Section 1.01 of FIG. 3 reflects a similar process as the description above for section 1.02 of FIG. 1, except that section 1.01 of FIG. 3 illustrates a result when a preference specifies that a default white space non-text graphic 320 should be used for the white space element instead of a white space graphic containing user-inputted text. In this case only one user-input step was necessary, wherein the user dragged a mouse over the words "each and every" 310. The connection graphic 315, comprised of two perpendicular line segments, connects the white space element 320 to the strikeout element 325 of the words "each and every" 310. In this instance, defining the change location signified completion of the user-input. Since no text was entered, upon receiving the change location, a strikethrough font attribute was automatically applied to the selected text 310, a default white space non-text graphic 320 for the white space element was automatically generated, and the connection graphic 315 was also automatically generated.

g) Section 1.02 of FIG. 4 reflects a similar process as the description above for section 1.01 of FIG. 3, except that, instead of changing a font attribute of the selected text, the preference settings specified that the selected text 405 should instead be reformatted so that the selected text 405 is indented from both the right and left margins, and that a reference graphic comprised of a box 410 surrounding the reformatted selected text should be overlaid onto the document at the change location. Section 1.02 of FIG. 4 also shows a white space non-text graphic 420 and a connection graphic comprised of perpendicular line segments 415 and 417. The connection graphic connects to the upper left-hand corner 425 of the reference graphic. The modified change location contains the same text 405 that was in the change location prior to adding the marked changes and the modified change location also contains the added box 410 surrounding the text 405.

h) Section 1.02 of FIG. 5 reflects a similar process as the description above for section 1.02 of FIG. 4, except that, in this instance, the preferences do not specify that a reference is to be generated at the change location. In this case, an operation performed on the selected text 505 results in the selected text 505 being reformatted by indenting the selected text 505 from both sides as in Section 1.02 of FIG. 4. The white space non-text graphic 520 is then generated, and a connection graphic 515 is also generated connecting to a point on or near the selected text 505.

i) Section 1.02 of FIG. 6 reflects a similar process as the description above for section 1.01 of FIG. 3, except that, in this instance, instead of changing a font attribute of the selected text, the preference settings happen to specify that user-inputted text (the word "provisions" 605) should replace the selected text (the word "terms" 630 was the selected text, which originally appeared in the change location as can be seen in section 1.01 of FIG. 6) instead of including the user-inputted text in the white space element.

The preferences further happen to specify that a box 610 should be overlaid onto the document so as to surround the user-inputted text. Section 1.02 of FIG. 6 also shows a white space non-text graphic 620 and a connection graphic 615. The connection graphic connects to the upper left-hand corner of the box 610. In this example, there were two items of user-input: i) selecting the text to be replaced (the word "terms"); and ii) entering the word "provisions". The modified change location contains the word "provisions" 605 and the box 610 surrounding "provisions".

j) Section 1.03 of FIG. 6 reflects a similar process as the description above for section 1.02 of FIG. 6, except that a third item of user-input happened to be used: entry of the words "Initial here!" for a white space graphic 670. This example also shows the connection graphic 665, the replacement word "provisions" 655 entered by the user, a box 660 surrounding the replacement word and the point 675 where the connection graphic meets the corner of the box 660.

k) Section 1.01 of FIG. 7 reflects a similar operation as detailed in application Ser. No. 12/424,005 for Line Strikeout and Replace, except that, in this instance, only one user input step was necessary: defining the change location. Once the change location was defined, a reference graphic 710 was generated at the change location to indicate that the word "agreement" was stricken, a default white space non-text graphic 720 was generated in the left margin, and a connection graphic 715 was generated connecting the white space non-text graphic with a point 705 on the reference graphic.

FIG. 8 shows the profile display of a digitized document containing text.

FIG. 9 is the profile display of the FIG. 8 document after the document was modified by the claimed invention. The modification occurs after the user has selected text (the words "swimming pool" 910) and entered an additional portion of text ("fish pond" 930), without additional user input. The modification is designed to indicate that the words "swimming pool" 910 are no longer applicable to the purpose of the document, and instead substitute words "fish pond" 930 apply. FIG. 9 shows the modification: a strikeout font attribute has been applied to "swimming pool" 910, as can be seen by the strikethrough element 920; and an informational graphic has been generated in the relative white space 940 of the document, wherein the informational graphic is comprised of a white space element 920 containing the substitute text "fish pond" 930 and a connection graphic (comprised of one horizontal line segment 915 and one vertical line segment 917) connecting the white space element 920 to the strikethrough element 925 of the selected text 910.

FIG. 9 shows examples of the location of relative white space: in a margin 940, between paragraphs 942, the white space occupied by a space bar character 944; and between lines of text of a paragraph 946.

In FIG. 9 characters of text are displayed. An example of the characters of text is the letter "A" 950 which was created from a font having a typeface of Arial. The word "Contract" 955, also created from a font having a typeface of Arial, has a bold font attribute for emphasis and a font-size attribute of 24 points that causes the word to be displayed larger than the other characters of text in the document which have a font-size attribute of 12 points.

FURTHER EMBODIMENTS

It is an objective of the claimed invention to automate the process of applying a font attribute change to a textual attribute in a document, with a result that an informational graphic containing an additional portion of user-inputted text is generated, without making a formatting attribute change, in a relative white space of the document. By preserving the document's formatting attributes, as is essential in some applications such as preparation of legal contracts, the shape of the profile display is not altered and the document's pages may be printed on paper of the same shape, such as a standard paper-size of 8.5"×11".

The final display, including the font attribute change and informational graphic, is usually referred to as the profile display. The informational graphic often conveys information regarding the font attribute change (such as the event that caused the informational graphic to be generated in the first place) to a user via the profile display.

It is envisioned that some aspects of the claimed invention may be incorporated into a text editing computer application.

It is often desirable to change (add, modify or remove) one or more font, textual or graphical attributes to convey additional information to a reader. For example, bold or italic font attributes may be applied to original document text for emphasis. A strikethrough font attribute, in contrast, may be applied to text to reflect that certain text may no longer be applicable in the most recent document revision (as is well known to those of skill in the art, in the case of the strikethrough font attribute, this is achieved without entirely or unduly obstructing the readability of the stricken text).

Once a font attribute change has been performed, it may be desirable to provide a user with additional visual and/or textual information regarding the font attribute change that just occurred. Such additional visual or textual information could provide the user with a visual indication or reminder that encapsulates and/or expounds upon various information regarding the font attribute change. One example of such additional visual information could be a message reading "This paragraph was italicized Oct. 27, 2017". In that example, the words 'paragraph' and 'italicized' may be inferred from the type and location of a font attribute change, and the date may be retrieved from the computer application or operating system, or even entered manually by a user. Such information may be relayed visually via an informational graphic as previously defined.

As described above, in some other instances it could be beneficial for a user to add personalized information directly to an informational graphic. In some embodiments, this could occur during a user input step. Such a personalized message could read "Ask Evelyn" (for example). In a different example, the user could be allowed to enter replacement text for the stricken-through text directly onto the informational graphic.

In providing the additional information conveyed by the informational graphic to a reader, it can be important to place the informational graphic strategically in the profile display. In some embodiments, the informational graphic is generated in the vicinity of the font, textual or graphical attribute change responsible for the generation of the informational graphic. Thus, in some embodiments, the white space element (of the informational graphic) may be published in the margins, with the connection graphic extending implicitly or explicitly towards the region of the font, textual or graphical attribute change or towards the reference graphic.

In some embodiments, a profile display will be updated with both the informational graphic and font, textual or graphical attribute change in a "what you see is what you get" (WYSIWYG) configuration, as will be well known to one of skill in the art. More specifically, WYSIWYG is a term of art used to characterize the methodology of producing a scaled document display that is, apart from scaling, replicates upon printout or further display of the document. Merriam Webster defines WYSIWYG as "a display generated by word-processing or desktop-publishing software that exactly reflects the document as it would appear in its finished state".

When making a font, textual or graphical attribute change to a document, generally, a text editor will reflect the change in the profile display. If the textual or font attribute changes the size or amount of text in the profile display, the text editor may make a subsequent update to the profile display by causing other text to shift in a manner determined by the existing formatting attributes of the document. Such shifting of text following a font, textual or graphical attribute change does not cause or result in a further font, textual or graphical attribute change or formatting attribute change. Such shifting of text may be viewed as "automatic" since no additional user interaction is required to cause the shifting to occur. Therefore, the automatic shifting of text in the profile display following a font or textual attribute change is not considered to have performed a document modification for the purpose of this disclosure. A document modification, in contrast, arises from changes to the existing textual, font, graphical and formatting attributes of the document, and not to automatic shifting of text in the profile display as described above.

In addition to making a font, textual or graphical attribute change to selected text, the claimed invention may place an informational graphic in the relative white space of the document. Due to the potential for the white space in the document to be modified by a font, textual or graphical attribute change to the selected text or the automatic shifting of text resulting from the textual or font attribute change, the relative white space may be determined immediately after the font, textual or graphical attribute change and the automatic shifting discussed above, and the location of relative white space in the document where the white space element is to be placed may be determined. Therefore, when determining a location for an informational graphic, the claimed invention can take into account a change in white space resulting from a textual or font attribute change to the selected text and the automatic shifting of text resulting from the textual or font attribute change.

Some related art applications may not determine the relative white space of the document within which to place a white space element. Instead, a related art technique may employ an approach such as white space amplification (enlarging a targeted white space area for the placement of a white space element) without preserving the document's formatting attributes. That approach can never hope to succeed, however, because it causes an arbitrary formatting attribute change that may alter the document in an undesirable way, as explained below.

For example, and referring to the above discussion, consider a document that has the original rectangular dimensions of 8.5×11 units. Various related art methods (such as those described above) may change the dimensions of the document such that the document no longer conforms to the original 8.5×11 unit format. This may be accomplished by increasing the document width and placing additional text or graphics within the enlarged white space.

Other related methods may change the document's shape through various other formatting attribute changes. In some instances, a formatting attribute change could add a section or panel or similar formatting attribute in furtherance of the strategic placement of a graphical or textual element to augment the document's previous shape. In order to enlarge the amount of available white space to an acceptable size (e.g., in order to facilitate placing a white space element within the total available white space), often, some other related art methods may change a formatting attribute related to the document margins (or may demagnify only a portion of the document's content).

For example, a related art technique may increase a right or left margin thereby reducing the horizontal space between the margins. In that event, the region between the document's margins and paragraphs of text or other content between the margins could become narrower, and the document may become taller as text flows in a downward fashion. Alternatively, a related art technique may 'demagnify' a portion of the document in order to create additional white space. But, the demagnified document content in the profile display may be more difficult to read. Thus, in this example, when using a related art technique, the document's formatting attributes and original shape would not be preserved. Additionally, some related methods utilized by text editors might not perform the above-discussed processes with the same degree of functionality or automation as those described herein (with reference to the claimed invention). For example, a related method may place a graphic in a margin to indicate that a change was made to line of text, but may fail to include a connection graphic that could identify or reference the specific change within the line of text. Related art methods may also fail to include textual information in a graphic that will provide additional information related to the font, textual or graphical change. Additionally, a related method may simply delete the selected text instead of applying a strikeout font attribute to the text.

Some related art techniques may reflect text as stricken by simply overlaying a static line on top of the document where the text to be stricken appears. One problem with some existing art methodologies is that the overlay line may not be associated with data that relates the start and end of the overlaid line with the start and end of the text on which the line is overlaid. As a result, if the text to be stricken later moves within the document as a result of further editing by a user, the overlaid line may no longer appear on top of the text to be stricken. Additional problems that might also occur in a related art technique (if the user later applies a font-size attribute change to the document) is that 1) the overlaid line may no longer appear in an appropriate vertical position for the new font size, and 2) the overlaid line may appear on top of additional text or less than the text to be stricken.

Further still, there can be an additional problem in the difficulty of determining an appropriate vertical position in which to place the overlaid line for each of the font-sizes and typefaces that may appear in a documents using an overlaid line. To provide a comparison, the act of applying a strikeout font attribute (as performed by the claimed invention) does not require a determination of the vertical position of a strikeout element; instead, the positioning of a strikeout element is accomplished automatically, by the text editor or operating system once a strikeout font attribute is applied to text, as will be well known to those skilled in the art. Further, some font variations (such as italic) cannot be easily (if at all) applied to text attributes using an overlay.

The claimed invention may additionally offer benefits beyond those in relation with the various related art methods described above, such as: 1) maintaining a document's familiar appearance (by placing an informational graphic in the document's relative white space without any change to the document's existing formatting attributes); 2) indicating that text in a document is stricken (by applying a font attribute change to the text to provide a superior visual appearance, as compared with a line overlay); 3) automating the markup process beyond the known methods currently encompassed by the various related arts, as further described below; and 4) conditioning the modified document for viewing or printing (e.g., in a WYSIWYG or other format).

In relation to item 3) above, regarding automation, related art computer applications can require more than selecting text and entering a portion of additional text to make a font attribute change to a document, add a white space element containing the additional text in the relative white space of the document, and add a connection graphic to the document connecting the white space element to the font attribute change. In some instances, related art methods may require a user to 1) select text; 2) enter text to include in the white space element; 3) create a white space element containing the user-inputted text; 4) position the white space element within the relative white space of the document; and 5) create a connection graphic connecting the white space element to the selected text. Moreover, steps 3, 4 and 5 may themselves require additional user-input steps. For example, the user may be prompted to create and position a text box to hold the white space element, and may enter values relating to a variety of settings. Some settings that may be permissible to enter values for may include specifying the coordinates of where the white space element is to be placed in the relative white space, specifying that an absolute position may be used for the text box and specifying that the text box will not cause text to wrap (or come other similar setting that prevents other document content from changing position as a result of adding the white space element). In order to create a connection graphic, a user of a related art methodology may be required to create individual line segments and precisely position them so that the segments visually connect with one another in a fluid fashion. Moreover, a user may be required to construct a segment connecting to the font attribute or other change in the document, and additionally to construct a segment connecting to the white space element. In addition to the time required for the user to perform the additional steps, it is significant that the automation provided by this method would not require that the user learn how to perform the above-mentioned additional steps 3, 4 and 5, as would be required in the case of some other related art.

The concept behind producing a document in a familiar format may be illustrated by the process of proposing and effectuating changes to a legal contract. In those cases it is customary to reflect that a word is stricken, without deleting it, and to interlineate substitute text. To reflect a word as stricken, a strikeout font attribute will be applied to the word. An intention to use a substitute word may be reflected by generating a white space element containing the substitute word within the white space of the document and a connection graphic will also be generated.

A problem with related art may be illustrated by an additional example. Consider a document with one or more rectangular pages each having dimensions of 8.5 units by 11 units. Suppose the word "big" should be reflected as the word "small" and that an informational graphic should be placed in the relative white space of the document. A significant disadvantage of related art that increases a document's width or adds a section or panel outside of the document's previous shape (in order to create additional white space to hold an informational graphic) is that the document may no longer be printed on 8.5×11 paper without a further demagnification process or formatting attribute change.

With this claimed invention, a strikeout font attribute will be added to the word "big", and the informational graphic will then be placed in the relative white space of the form. Since the informational graphic is generated in the relative white space, the end result, when displayed or printed, will retain the document's existing customary shape and other formatting attributes and each page may be printed as a rectangular shape that may fill and be printed within a standard paper size of 8.5" by 11" or may be displayed as a rectangular shape with dimensions of 8.5 by 11 units.

In certain legal and other applications that require paper documents, the ability to print the document on standard paper sizes, without changing the document's formatting attributes, is essential. In contrast to the claimed invention, prior art that changes the shape of a document by enlarging white space may not be appropriate for use as the final document that may be printed on standard paper sizes. Alternatively, prior art may create additional white space by arbitrarily demagnifying a portion of the document. By doing so the content in the demagnified portion will be reduced from its intended size which may make the demagnified portion more difficult to read.

With the claimed invention, the addition of the informational graphic to the relative white space of the document does not change the existing shape or formatting attributes of the document, and therefore the document may be suitable for use as the final signatory document (electronically or in print). A prospective signer could view any or all of the font attribute changes, along with their associated informational graphics (white space elements and connection graphics), and the prospective signer may sign and/or initial the contract to specifically indicate assent to the modification(s) reflected by the font attribute change(s) and informational graphic(s). In a preferred embodiment, no more than selecting text and entering an additional portion of text are required to make at least three modifications to the document: generate a font attribute change to the selected text, generate a white space element within the document's relative white space and generate a connection graphic in the relative white space that creates a visual connection between the white space element and the textual attributes that were the subject of the font attribute change. The display profile will include the white space element and connection graphic commonly referred to as informational graphics. The user input steps generally include selecting a textual attribute in a digitized document and entering additional text to include in a white space element. During the course of operation, in some embodiments, a processor may detect the moment that either or both of the user input events have occurred. These user input events could include: (a) the selection of a portion of document text and (b) user entry of additional text. The process of declaring, raising, detecting and reacting to user input events such as these would be well known to one of skilled in the art. Once the user performs both steps, a strikeout font attribute is automatically applied to the selected text attribute, and a white space element containing the user-inputted text and connection graphic are automatically added to the relative white space of the document.

In one embodiment, a user may desire to indicate that textual attributes such as a characters or words of text are intended to be inserted adjacent to or between existing characters of text, words or paragraphs in the original document. To do so, the user may select a geometric point in a white space of a document near a character of text where the intended insertion is to is to be reflected and enter an additional portion of text that is to be reflected as inserted. Thereupon the claimed invention can automatically record an item of data containing: the identity of the specific character of text (the "identified character") that is closest to the point selected ("the insertion point"); additional data specifying whether the user selected a point occurring within the flow of the document that is either before or after the identified character of text; and the user-inputted additional portion of text. That item of data may be referred to as "the insertion data". The claimed invention can thereupon generate a white space element containing the user-inputted text within the white space of the document and further, may generate a connection graphic within the document connecting the white space element to the point selected by the user. The claimed invention may also generate a reference graphic such as a caret at the insertion point within the document's white space.

This embodiment may exhibit an advantage over existing art that may accomplish a similar result by overlaying the added portion of text, a connection graphic and white space element on top of the digitized document. Such prior art often may not record the insertion data and, therefore, if further text editing results in a change of the position of the identified character, will not be able to automatically revise the connection graphic to connect the white space element at a point near the relocated identified character (or to relocate the white space element to a place in the white space that is near the identified character or to relocate the reference graphic to the new insertion point).

In contrast, if further text editing results in a change of the position of the identified character, the claimed invention, using the insertion data, may: 1) relocate the white space element to a location within the relative white space that is visually near the relocated identified character; 2) revise the connection graphic to connect the relocated white space element to a point in the relative white space ("the new insertion point") that is adjacent to the revised location of the identified character; and 3) and relocate the reference graphic, if any, to the new insertion point. The new insertion point may be a point that is either before or after (as determined by the insertion data) the identified character in the flow of the document. The new insertion point may be visually located between the identified character and an adjacent character (the adjacent character will be a character that is either before or after the identified character and with no intervening characters according to the before or after position recorded in the insertion data). Alternatively, in the case of an insertion point that is located near the beginning or end of a line or paragraph of text, the insertion point will be placed visually closer to the identified character than any other character.

Marginal Element Placement

In a further embodiment, a white space element may be placed in the left or right margin of the document, whichever is closest to the font, textual or graphical attribute change that causes the informational graphic to be generated. The vertical position of the generated white space element may be close to the vertical position of the font, textual or graphical attribute change that causes the informational graphic to be generated. A connection graphic is also generated and connects the white space element to the font, textual or graphical attribute that caused the generation of the connection graphic and white space element.

Sometimes it may be necessary to make multiple font, textual or graphical changes in a document, each of which may require that informational graphics be generated. Related art may add multiple sets of text and graphics to a document that relate to a change in a document's content, without ensuring that none overlap, making it difficult for a reader to discern the meaning of the added text and graphics. For example, related art may use a single graphical connection such as a graphical line to refer to multiple font, textual or graphical attributes within a line of text. This approach can suffer the problem that a reader may not be able to infer which of the font, textual or graphical attributes that each white space element applies to.

In contrast, the claimed invention places informational graphics strategically so that none of them in the document overlap and is therefore a superior method compared with related art.

Using the claimed invention, when an additional font, textual or graphical change is made that causes a second or further white space element to be generated, a location for informational graphics may be automatically be selected so that the additional informational graphics do not overlap other informational graphics in the document.

To avoid overlapping informational graphics, before they are generated the claimed invention determines the location of existing informational graphics within the document. A second or further white space element may be placed in a different margin or in a different position within a margin that already contains a white space element. Additionally, a connection graphic, which does not overlap previously generated connection graphics, may be generated in the document and connects the additional white space element to the additional font, textual or graphical attribute that caused the generation of the additional white space element.

FIG. 10 contains an example of informational graphics wherein overlapping was avoided. FIG. 10 shows an existing white space element 1010 in the left margin, selected text (the word "supplies") 1015 after a strikeout font was applied and connection graphic 1017 comprised of horizontal and vertical line segments. FIG. 10 shows a second white space element 1030 in the right margin, selected text (the word "agreement") 1035 after a strikeout font was applied and connection graphic 1037 comprised of horizontal and vertical line segments. FIG. 10 shows a third white space element 1050 in the left margin, selected text (the word "By") 1035 after a strikeout font was applied and connection graphic 1057 comprised of horizontal and vertical line segments. While white space element 1050 was placed in the same margin as white space element 1010, overlapping was avoided by positioning white space element 1050 in a different vertical position from white space element 1050.

The claimed invention improves on related art since each separate connection graphic may connect and clearly refer to a single font, textual or graphical change and a single white space element and it would not be difficult for a reader to discern the meaning of each connection graphic.

In another embodiment, it may be desirable to generate a reference graphic and white space element without a connection graphic, and to overlay them on top of the document, without otherwise making a change to the original document. Doing so without a connection graphic may be useful where the reference graphic and white space element are placed close enough to one another on the document so that the relation between the reference graphic and white space element may be clear and inferred by a reader. Generally, in this embodiment, the reference graphic will be a line overlaid on top text in the document.

Related art may not provide an automated method to accomplish generation of a reference graphic and white space element. In some instances, related art methods may require a user to 1) either select text in the document or define a region of the document containing text; 2) enter text to include in the white space element; 3) create a white space element containing the user-inputted text; and 4) position the white space element within the white space of the document. Moreover, steps 3 and 4 may themselves require additional user-input steps as discussed earlier in this disclosure. In addition to the time required for the user to perform the additional steps, it is significant that the automation provided by this method would not require that the user learn how to perform the above-mentioned additional steps 3 and 4, as would be required in the case of related art.

In comparison with related art, the claimed invention is more automated. No more than selecting text in the document or defining a region of the document containing text and entering an additional portion of text are required to generate and overlay a reference graphic and white space element on top of the document. Another advantage of the claimed invention is the document will not be unduly cluttered with a connection graphic when the connection graphic is unnecessary for the reasons mentioned above.

The display profile will include the white space element and reference graphic overlay. The user input is generally comprised of selecting textual attributes in a digitized document and entering an additional portion of text to include in a white space element.

Electronic Signing Sessions

In a further embodiment, the claimed invention automates the process in which a presentee of a document in an electronic signing session initiates a proposed change in contract terms and counter-offer.

One problem with related art in the field of electronic signatures is that related art does not provide an automated method for initiating and processing counter-offers made during electronic signing sessions. As an example when a counter-offer is desired, existing art may provide a user with the ability to create a text box that includes a strikeout line or strikeout character, position the text box over existing text to be stricken, create and position a text box that includes proposed replacement text and create and position a button element that may be used to initiate the counter-offer process.

In contrast, in a further embodiment, the claimed invention automates the counter-offer process. The claimed invention may be incorporated into an electronic signature session computer program and may include a virtual button within a white space element of a document wherein the virtual button may be used to initiate and process a counter-offer during an electronic signing session. The user steps required for this process are: 1) Defining a region of the document containing text; and 2) entering an additional portion of text that is intended to replace the selected text. Thereupon the claimed in invention may: 1) generate a reference graphic (which may be a strikeout line) over the defined region; 2) generate a white space element that includes the additional portion of text and a virtual button to initiate a counter-offer; and 3) may generate a connection graphic connecting the white space element to the reference graphic.

Alternatively, the user steps required for this process may be comprised of the following: 1) selecting text in the document; and 2) entering an additional portion of text that is intended to replace the selected text. Thereupon, using this alternative, the claimed in invention may: 1) generate a font attribute change (such as a strikeout font attribute) to the selected text; 2) generate a white space element that includes the additional portion of text and a virtual button to initiate a counter-offer; and 3) may generate a connection graphic connecting the white space element to the selected text.

A presentee of a document may initiate a counter-offer by activating a virtual button contained within a white space element. Once the counter-offer is initiated by a presentee of the document, the computer program will present the document, including the changes made by the presentee who initiated the counter-offer, to all other presentees so that the other presentees are offered the opportunity to sign and agree to the document as modified; the computer program will not reflect the completion of the signing process until all presentees have agreed to the document, as modified. (In order for the electronic signing session will be considered complete, a presentee who had signed the document before the counter-offer was initiated would be required to sign again following the counter-offer to indicate assent to the contract as modified.)

As defined above, "Electronic signing session" refers to a process of electronically presenting a document to one or more persons in order to obtain their electronic signatures to the document and recording responses from those persons. An electronic signing session may be initiated through a computer program when a user identifies a document to be signed and the persons to whom the document will be presented for signature. The initiator may also designate the manner of presenting the document, such as by email notification or making the document available for review on a web page. The computer program may also provide the presentees with an electronic means to respond to the presented document. Generally, a response will be either acceptance or rejection of the document. Creation of electronic signing sessions and computer programs used to initiate and process responses to the sessions will be well known to those skilled in the art.

In order to provide presentees with a means to electronically respond to a document, a textual or graphical element added to a document may include or be contained within an element that may be activated and cause further action by a user. Such an element may be referred to as a "button" or "link". A button or link is not a physical element but may be referred to as a virtual representation of a physical element, or simply as a "virtual button". A button or link may be created by a computer program and the program may include a collection of additional computer programming statements, commonly referred to as a function, that determines the action to be taken upon activation by a user.

A button, such as described, may be included in the profile display. Alternatively, the existence of a button may be communicated to a user by means other than a visually display, such as an audio prompt. A button may be activated by clicking on the element with a mouse, tapping on it with a finger, voice command or other user-interaction. The process of creating a virtual button or link which, when activated by a user, will cause a further programmed action to occur will be well known to those skilled in the art. A button may have graphical attributes that may be printed with a document if an option to print the button is selected by a user of the document, or the button may be omitted when printing the document.

Once all intended parties to the document have signed the document, the document may become a binding legal contract. Thereupon, an electronic signature session program may reflect that all presentees have agreed to the contract and that the signing session has been completed, generally by including one or more visual notifications in the document (such as by overlaying digitally created signatures on the document) or by recording an item of data indicating that all presentees have accepted.

Although specific embodiments have been illustrated and described herein, it will be appreciated by those of ordinary skill in the art and others, that a wide variety of alternate and/or equivalent implementations may be substituted for the specific embodiment illustrated and described without departing from the scope of the claimed invention. This present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. This application is intended to cover any adaptations or variations of the embodiment discussed herein. Therefore, it is manifested and intended that the claimed invention be limited only by the claims and the equivalents thereof.

What is claimed is:

1. A method of editing text in a digitized document, comprising:
   displaying the digitized document in a display area of a graphical user interface;
   receiving a first portion of text from a user;
   selecting, by a user, a second portion of text including at least one character of text in the digitized document;
   modifying, without additional user input, a font attribute of the second portion of text including the at least one character of text in the document; and
   generating, without additional user input, an informational graphic comprising a white space element within a second portion of the document and a connection graphic, wherein the white space element contains the first portion of text, and the connection graphic connects the white space element and the second portion of text.

2. The method of claim 1, wherein a location of the white space element is determined by a user action.

3. The method of claim 1, wherein the white space element of the informational graphic is automatically generated at a location that is close to the second portion of text and does not overlap with a second information graphic.

4. The method of claim 1, wherein the connection graphic is generated at a location that does not overlap a second connection graphic.

5. The method of claim 1, further comprising generating a user interface based on an attribute of the second portion of text.

6. The method of claim 1, further comprising generating a user interface based on an attribute of the second portion of text, wherein the user interface is configured to initiate a counter-offer.

7. The method of claim 1, further comprising generating a reference graphic.

8. The method of claim 1, further comprising: receiving an additional user input action; modifying the document based on the additional user input action; and, without additional user input, relocating the white space element and regenerating the connection graphic to connect the relocated white space element and the second portion of text.

* * * * *